(12) United States Patent
Mamori

(10) Patent No.: US 6,438,157 B1
(45) Date of Patent: Aug. 20, 2002

(54) SPREAD SPECTRUM RECEIVER

(75) Inventor: Yoshiki Mamori, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/363,725

(22) Filed: Jul. 29, 1999

(30) Foreign Application Priority Data

Oct. 19, 1998 (JP) .......................................... 10-296884

(51) Int. Cl.[7] .................................................. H04K 7/00
(52) U.S. Cl. ....................................................... 375/149
(58) Field of Search ................................ 375/130, 134, 375/137, 140, 149, 145, 367, 136, 142, 147, 150; 370/515

(56) References Cited

U.S. PATENT DOCUMENTS 5,654,979 A * 8/1997 Levin et al.
5,784,366 A * 7/1998 Apelewicz ................... 370/342
5,909,435 A * 6/1999 Apelewicz ................... 370/342

* cited by examiner

*Primary Examiner*—Jean Corrielus
(74) *Attorney, Agent, or Firm*—Pearne & Gordon LLP

(57) ABSTRACT

In a spread spectrum receiver, a despread section 102 despreads received signals ELI and ELQ through correlation of spread signals PnI and PnQ. An integration section 103 integrates I-phase correlation data PELI and Q-phase correlation data PELQ. A lead/lag addition section 104 adds, to I-phase integration data PELICc, lead/lag information representing whether the signal output from the integration section is in a lead phase or a lag phase. A delay circuit 108 delays, by one symbol, Q-phase integration data PELQCc and I-phase lead/lag information added integration data PELIa. A lead/lag level difference output section 109 outputs a level difference TAC between lead phase and lag phase. Further, a timing control section 112 controls the phase of the entire loop so as to eliminate the level difference, thus tracking synchronization of the spread signals.

7 Claims, 4 Drawing Sheets

SPREAD SPECTRUM RECEIVER

BACKGROUND OF THE INVENTION

The present invention relates to a spread spectrum receiver having a synchronous tracking section for synchronously tracking a spread signal by correlating a phase-lead spread signal and a phase-lag spread signal by use of time division to thereby produce an error signal, and more particularly, to a spread spectrum receiver which enables reliable and highly accurate synchronous tracking and synchronous holding by simplified control of timing of a synchronous tracking loop and which affords high flexibility in terms of system design.

Rapid leads have been made in mobile communications technology, typified by a portable cellular phone compliant with a spread spectrum communication (hereinafter often abbreviated as "SS communication") system or a code division multiple access (i.e., CDMA) communications system. In such a communications system, synchronization used for extracting and holding a required timing signal from a received signal is indispensable for correctly reproducing received data through demodulation and despreading of a spectrum spread (SS) signal.

Synchronization of a carrier wave and data is required for receiving the spectrum spread signal, as in the case with receipt of another digital signal. Synchronization of a spread signal is critical, thus imposing a unique problem. Since a spread spectrum signal whose energy is spread over a wide frequency range is used in the spread spectrum communications system, a signal-to-noise (S/N) ratio is considerably low. Particularly, in the CDMA communications system, another channel signal is transmitted at the same frequency as is a desired signal, and hence a signal-to-interference (S/I) ratio is considerably low. For this reason, the S/N ratio or the S/I characteristic must be improved by correctly despreading a received spread spectrum signal. As a result of correct despreading of the received spread spectrum signal, a conventional technique used for demodulating an ordinary signal can be applied to synchronization of a carrier wave and data.

For these reasons, in the spread spectrum communications system, synchronization is carried out in two steps by use of two independent circuit means. One step is a "synchronization acquisition" step in which timing information is narrowed down to predetermined uncertainty, e.g., an extent substantially equal to the time duration of a chip, by observation of a received signal, and the timing at which the receiver activates a spread system is matched to the timing of the received signal. Another step is "synchronization tracking" for more accurately holding the timing that is obtained through synchronization acquisition so as to prevent the spread system of the receiver from causing a timing lag.

To correctly carry out synchronization tracking, a timing error of the received signal must be restrained within a certain extent through synchronization acquisition. Since synchronization acquisition requires high-speed characteristics, an open loop is primarily employed. In contrast, since synchronization tracking imposes special emphasis on accuracy, observation must be performed for a comparatively long period of time in order to reduce the influence of noise. For this reason, a closed loop is primarily used.

FIG. 4 is a circuit configuration of a synchronization tracking section in a RAKE receiver, which is one example of a conventional spread spectrum receiver. A τ-dither loop is used as the synchronization tracking section of the RAKE receiver, and this τ-dither loop constitutes a closed loop employing one set of correlators (despreading sections). Taking note that an autocorrelation function assumes a triangular shape in the vicinity of a correct point of synchronization, the τ-dither loop causes the phase of a spread signal (or a pseudo noise system code) produced by the receiver to slightly lead the point of synchronization and slightly lag the point of synchronization, extracts variations in a correlation value caused by the phase lead and phase lag of the spread signal relative to the point of synchronization (i.e., variations in the amplitude of the signal that has been despread), and controls the phase of oscillation of the entire synchronization tracking section so as to reduce the variation to zero.

In FIG. 4, the synchronization tracking section of the conventional spread spectrum receiver comprises a sampling section 101, a despread section 102, an integration section 103, a lead/lag phase level difference output section 409, a pseudo noise (PN) code generator 111, and a timing control section 412.

The sampling section 101 samples a received signal RxI[i-1:0], which is received byway of an unillustrated antenna and is in phase with a received carrier wave, as well as a received quadrature signal ExQ[i-1:0], which differs in phase from the carrier wave by 90°, at the timing of an ELCLK signal output from the timing control section 412. Each of the received signals RxI and RxQ has a duration of i-bits. To clarify the bit configuration of a signal, the received signals are represented as RxI[i-1:0] and RxQ[i-1:0].

Signals ELI[i-1:0] and ELQ[i-1:0] resulting from sampling of the received signals RxI[i-1:0] and RxQ[i-1:0] by the sampling section 101 are despread by the despread section 102 through correlation of the PN system codes PnI and PnQ that are output from the pseudo noise code generation section 111 and serve as spread signals. The despread section 102 outputs to the integration section 103 correlation data PELI[j-1:0] and PELQ[j-1:0], each correlation data set comprising j-bits. According to a signal PNc which is output from the timing control section 412 and represents whether the spread signal is in a lead phase or a lag phase, the PN code generation section 111 supplies the PN system codes PnI and PnQ, each of which is in a lead phase or a lag phase, to the despread section 102 by use of time division.

On the basis of a signal EL1 which is supplied from the timing control section 412 and indicates whether the lead-phase or lag-phase correlation data is computed, as well as on the basis of an Integ signal representing an integration number, the integration section 103 integrates the correlation data PELI[j-1:0] and PELQ[j-1:0] thereby outputting integration data PELICc[k-1:0] and PELQCc[k-1:0], each integration data set comprising k-bits, to the delay circuit 108 which delays the lead/lag phase level difference output section 409 and the integration data by one symbol. More specifically, the delay circuit 108 outputs delayed integration data PELId[k-1:0] and PELQd[k-1:0] each comprising k-bits, that are formed by delaying the integration data PELICc[k-1:0] and PELQCc[k-1:0] by one symbol.

The lead/lag level difference output section 409 outputs a level difference (i.e., an error signal) between the lead phase and the lag phase to the timing control section 412, on the basis of the integration data PELICc[k-1:0] and PELQCc[k-1:0], the delayed integration data PELId[k-1:0] and PELQd[k-1:0), and the signal EL2 representing whether the current symbol corresponds to lead phase or lag phase.

The timing control section 412 controls the phase of the entire synchronization tracking section by controlling sampling timing (i.e., the timing of the ELCLK signal) and the timing at which each of the signals PNc, EL1, and EL2 is switched between lead phase and lag phase, so as to reduce the level difference TAC to zero.

However, in the synchronization tracking section of the foregoing conventional spread spectrum receiver, the signal EL1—which represents whether or not the integration section 103 integrates a lead-phase or lag-phase correction value—and the signal EL2—which represents the integration data output from the integration section 103 are in a lead phase or a lag phase—are not input to the lead/lag phase level difference output section 409 at the same timing. No problem arises so far as the correlation between the two signals EL1 and EL2 is correctly maintained. However, if for any reason the correlation becomes offset, tracking for the purpose of further improving the synchronization of the spread signal (i.e., the PN system code) roughly captured by the search circuit becomes impossible, which in turn makes holding of synchronization impossible.

The constituent elements of the synchronization tracking section shown in FIG. 4 are embodied by circuits and a digital signal processor (DSP). There is a time lag between the timing at which the sampling timing signal ELCK is output from the sampling section 101 and the timing at which the lead/lag phase level difference output section 409 performs processing operations. Timings of these two signals EL1 and EL2 must be set so as to comprise the time lag. The requirement for strict management of the individual processing timings of the loop makes system design inflexible.

SUMMARY OF THE INVENTION

The present invention has been conceived in light of the foregoing problems and circumstances, and the object of the present invention is to provide a spread spectrum receiver having a synchronization tracking section which performs a correlation operation, by use of time division, for generating an error signal between a phase-lead spread signal and a phase-lag spread signal, wherein timing control required by a loop to perform synchronization tracking such as setting of timing of a signal which indicates whether a signal supplied to constituent elements for performing integration and level difference operations is in a lead phase or a lag phase is further simplified, thereby enabling highly accurate and reliable synchronization tracking and holding and affording a high degree of flexibility in terms of system design.

According to a first aspect of the present invention, there is provided a spread spectrum receiver having a 10 synchronization tracking section for tracking synchronization between a phase-lead spread signal and a phase-lag spread signal through correlation of the spread signals by use of time division so as to generate an error signal between the two spread signals, the spread spectrum receiver comprising: despread means for despreading received signals through correlation; integration means for integrating the signal output from the despread means; lead/lag information addition means for adding, to the signal received from the integration means, lead/lag information representing whether the signal output from the integration means is in a lead phase or a lag phase; delay means for delaying, by one symbol, the signal received from the lead/lag information addition means; lead/lag level difference output means for outputting a level difference between lead phase and lag phase on the basis of the signal output from the lead/lag information addition means and the signal output from the delay means; and timing control means for controlling the phase of the entire loop so as to eliminate the level difference.

In the spread spectrum receiver according to the present invention, the despread means despreads, through correlation, two phase spread signals; i.e., a lead-phase signal and a lag-phase signal. The integration means integrates the signal output from the despread means, and the lead/lag information addition means adds, to the signal output from the integration means, lead/lag information representing whether the signal output from the integration means is in a lead phase or a lag phase. The delay means delays, by one symbol, the signal output from the lead/lag information addition means. The lead/lag level difference output means outputs a level difference between lead phase and lag phase on the basis of the signal output from the lead/lag information addition means and the signal output from the delay means. Further, the timing control means controls the phase of the entire loop so as to eliminate the level difference, thus tracking synchronization of the spread signals.

As mentioned above, the lead/lag information representing whether the signal output from the integration section is in a lead phase or a lag phase is added to the integration data and the delayed integration data supplied to the lead/lag level difference output means. In contrast with the conventional spread spectrum receiver, the spread spectrum receiver according to the present invention eliminates a necessity for the timing control means to control the timing of the lead/lag level difference output section in consideration of a lag of a signal and a processing lag, which would otherwise be required by the conventional synchronization tracking section. Control of timing of the synchronization tracking loop is made simpler, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

In a case where a multiple-frequency shift-keying method is employed as a modulation method, two methods are conceivable; i.e., a method by which the lead/lag information addition means adds, to integration data which is one phase component relative to a carrier wave, typical information representing whether integration data are in a lead phase or a lag phase, and a method by which the lead/lag information addition means adds, to integration data which are all phase components relative to a carrier wave, typical information representing whether integration data are in a lead phase or a lag phase. If a typical quadrature phase shift keying (QPSK) is employed, there is employed one of the spread spectrum receivers as defined in the second, third, and fourth aspects (which will be mentioned bellow).

According to a second aspect of the present invention, there is provided a spread spectrum receiver having a synchronization tracking section for tracking synchronization between a phase-lead spread signal and a phase-lag spread signal through correlation of the spread signals by use of time division so as to generate an error signal between the two spread signals, the spread spectrum receiver comprising: despread means for despreading, through correlation, a received signal which is in phase with a carrier wave and a received quadrature signal which differs in phase from the carrier wave by 90°; integration means for integrating both the in-phase and quadrature signals output from the despread means; lead/lag information addition means for adding, to the in-phase signal output from the integration means, lead/lag information representing whether the signal output from the integration means is in a lead phase or a lag phase; delay means for delaying, by one symbol, the quadrature signal output from the integration means and the signal output from the lead/lag information addition means; lead/lag level difference output means for outputting a level difference between lead phase and lag phase on the basis of the quadrature signal output from the integration means, the signal output from the lead/lag information addition means, and the signal output from the delay means; and timing control means for controlling the phase of the entire loop so as to eliminate the level difference.

In the spread spectrum receiver as defined in the second aspect of the present invention, despread means despreads, through correlation, a received signal which is in phase with a carrier wave and a received quadrature signal which differs in phase from the carrier wave by 90°; integration means integrates both the in-phase and quadrature signals output from the despread means; lead/lag information addition means adds, to the in-phase signal output from the integration means, lead/lag information representing whether the signal output from the integration means is in a lead phase or a lag phase; delay means delays, by one symbol, the quadrature signal output from the integration means and the signal output from the lead/lag information addition means; lead/lag level difference output means outputs a level difference between lead phase and lag phase on the basis of the quadrature signal output from the integration means, the signal output from the lead/lag information addition means, and the signal output from the delay means; and timing control means controls the phase of the entire loop so as to eliminate the level difference, thus tracking synchronization of the spread signals. As a result, control of timing of the synchronization tracking loop is made simpler, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

According to a third aspect of the present invention, there is provided a spread spectrum receiver having a synchronization tracking section for tracking synchronization between a phase-lead spread signal and a phase-lag spread signal through correlation of the spread signals in a time-division manner so as to generate an error signal between the two spread signals, the spread spectrum receiver comprising: despread means for despreading, through correlation, a received signal which is in phase with a carrier wave and a received quadrature signal which differs in phase from the carrier wave by 90°; integration means for integrating both the in-phase and quadrature signals output from the despread means; lead/lag information addition means for adding, to the quadrature signal output from the integration means, lead/lag information representing whether the signal output from the integration means is in a lead phase or a lag phase; delay means for delaying, by one symbol, the in-phase signal output from the integration means and the signal output from the lead/lag information addition means; lead/lag level difference output means for outputting a level difference between lead phase and lag phase on the basis of the in-phase signal output from the integration means, the signal output from the lead/lag information addition means, and the signal output from the delay means; and timing control means for controlling the phase of the entire loop so as to eliminate the level difference.

In the spread spectrum receiver as defined in the third aspect of the present invention, despread means despreads, through correlation, a received signal which is in phase with a carrier wave and a received quadrature signal which differs in phase from the carrier wave by 90°; integration means integrates both the in-phase and quadrature signals output from the despread means; lead/lag information addition means adds, to the quadrature signal output from the integration means lead/lag information representing, whether the signal output from the integration means is in a lead phase or a lag phase; delay means delays, by one symbol, the in-phase signal output from the integration means and the signal output from the lead/lag information addition means; lead/lag level difference output means outputs a level difference between lead phase and lag phase on the basis of the in-phase signal output from the integration means, the signal output from the lead/lag information addition means, and the signal output from the delay means; and timing control means controls the phase of the entire loop so as to eliminate the level difference, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

According to a fourth aspect of the present invention, there is provided a spread spectrum receiver having a synchronization tracking section for tracking synchronization between a phase-lead spread signal and a phase-lag spread signal through correlation of the spread signals by use of time division so as to generate an error signal between the two spread signals, the spread spectrum receiver comprising: despread means for despreading, through correlation, a received signal which is in phase with a carrier wave and a received quadrature signal which differs in phase from the carrier wave by 90°; integration means for integrating both the in-phase and quadrature signals output from the despread means; lead/lag information addition means for adding, to the in-phase and quadrature signals output from the integration means, lead/lag information representing whether the signal output from the integration means is in a lead phase or a lag phase; delay means for delaying, by one symbol, the signal output from the lead/lag information addition means; lead/lag level difference output means for outputting a level difference between lead phase and lag phase on the basis of the signal output from the lead/lag information addition means and the signal output from the delay means; and timing control means for controlling the phase of the entire loop so as to eliminate the level difference.

In the spread spectrum receiver according to the fourth aspect of the present invention, despread means despreads, through correlation, a received signal which is in phase with a carrier wave and a received quadrature signal which differs in phase from the carrier wave by 90°; integration means integrates both the in-phase and quadrature signals output from the despread means; lead/lag information addition means adds, to the in-phase and quadrature signals output from the integration means, lead/lag information representing whether the signal output from the-integration means is in a lead phase or a lag phase; delay means delays, by one symbol, the signal output from the lead/lag information addition means; lead/lag level difference output means outputs a level difference between lead phase and lag phase on the basis of the signal output from the lead/lag information addition means and the signal output from the delay means;

and timing control means controls the phase of the entire loop so as to eliminate the level difference, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

According to a fifth aspect of the present invention, the spread spectrum receiver preferably comprises sampling means for sampling the received signal at predetermined sampling timing; the despread means preferably despreads the thus-sampled received signal; and the timing control means preferably controls the sampling timing according to the level difference.

In the spread spectrum receiver according to the fifth aspect of the present invention, it is preferable for the sampling means to sample the received signal at predetermined sampling timing; the despread means to despread the thus-sampled received signal; and the timing control means to control the sampling timing according to the level difference.

According to a sixth aspect of the present invention, in the spread spectrum receiver, the spread signal corresponds to a pseudo noise code. The spread spectrum receiver preferably comprises pseudo noise code generation means for supplying to the despread means, by use of time division, two pseudo noise codes; namely, a phase-lead pseudo noise code and a phase-lag pseudo noise code, according to a lead/lag signal representing whether the signal is in a lead phase or a lag phase. The timing control means controls the timing at which the lead/lag signal is switched according to the level difference.

In the spread spectrum receiver according to the sixth aspect of the present invention, the spread signal preferably corresponds to a pseudo noise code. Preferably, pseudo noise code generation means supplies to the despread means, by use of time division, two pseudo noise codes; namely, a phase-lead pseudo noise code and a phase-lag pseudo noise code, according to a lead/lag signal representing whether the signal is in a lead phase or a lag phase. Preferably, the timing control means controls the timing at which the lead/lag signal is switched according to the level difference. The expression "pseudo noise code" designates a "pseudo noise code in a broad sense" and covers various code systems such as the M code system and the Gold code system.

DETAILED DESCRIPTION OF THE PREFERRED EMBODIMENTS

Spread spectrum receivers according to embodiments of the present invention will be described in detail hereinbelow, in sequence from a first embodiment to a third embodiment, by reference to the accompanying drawings. In each of the embodiments, a synchronization tracking section employs a τ-dither loop which constitutes a closed loop employing only one set of correlators (or despread sections). Taking note that an autocorrelation function assumes a triangular shape in the vicinity of a correct point of synchronization, the τ-dither loop causes the phase of a spread signal (or a pseudo noise system code) produced by the receiver to slightly lead the point of synchronization and to slightly lag behind the point of synchronization, extracts variations in a correlation value caused by the phase lead and phase lag of the spread signal relative to the point of synchronization (i.e., variations in the amplitude of the signal that has been despread), and controls the phase of oscillation of the entire synchronization tracking section so as to reduce the variation to zero.

The synchronization tracking section employs a quadrature phase shift keying (QPSK) as a modulation method. The constituent elements of the loop process in-phase and quadrature components of the received signal. In a case where the QPSK method is applied to a RAKE receiver, the synchronization tracking section according to the respective embodiments processes inphase and quadrature components of a signal. In a case where the QPSK method is applied to the RAKE receiver, the synchronization tracking section according to the respective embodiment is constituted within a finger circuit of the RAKE receiver.

[First Embodiment]

Figure 1:
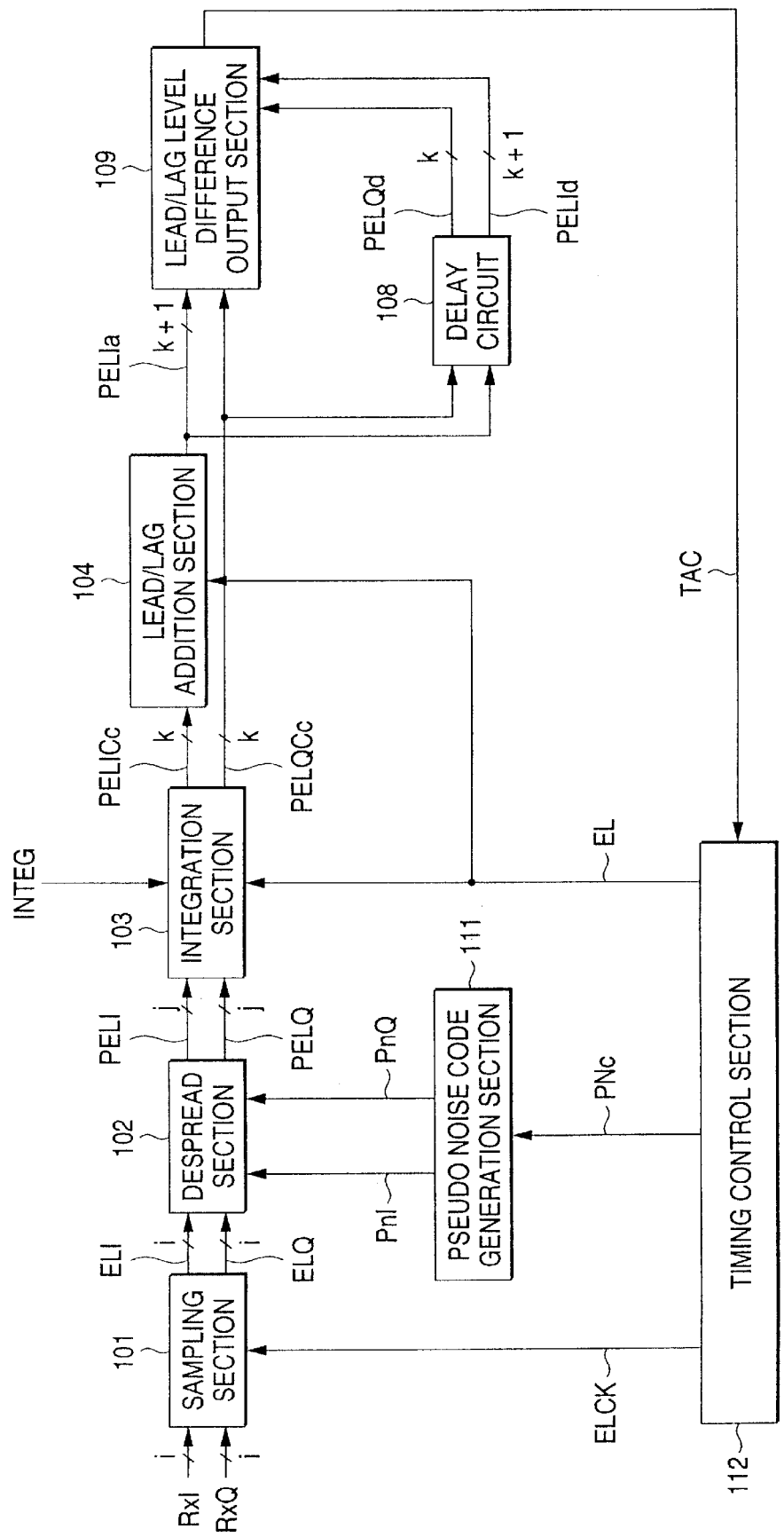
FIG. 1 is a circuit diagram showing the configuration of a synchronization tracking section in a spread spectrum receiver according to a first embodiment of the present invention.
Figure 4:
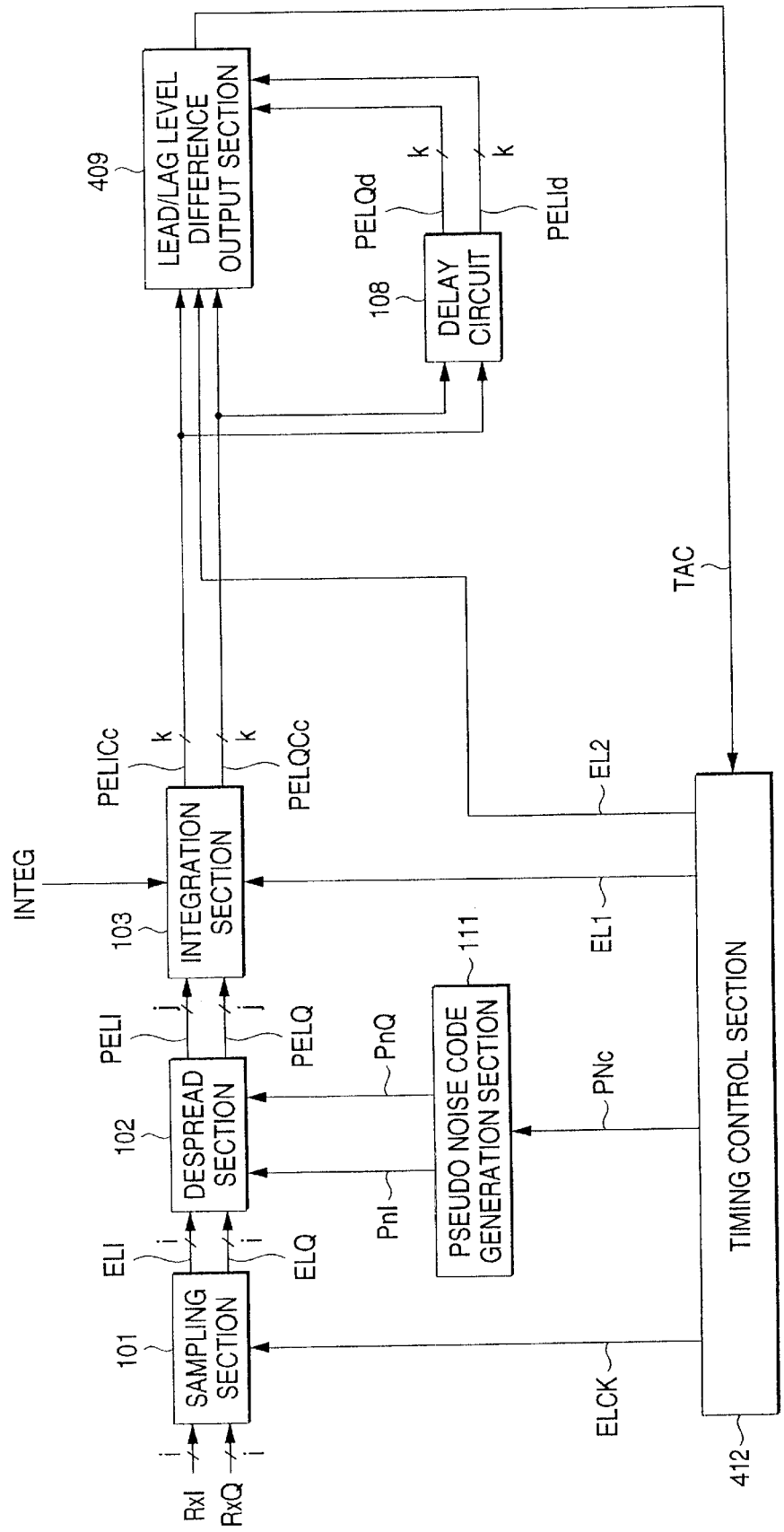
FIG. 4 is a circuit diagram showing the configuration of a synchronization tracking section in a RAKE receiver which is one example of a conventional spread spectrum receiver

FIG. 1 is a circuit diagram showing a synchronization tracking section in a spread spectrum receiver according to a first embodiment. In the drawing, the elements that are equivalent to those shown in FIG. 4 are assigned the same reference numerals.

As shown in FIG. 1, the synchronization tracking section of the spread spectrum receiver according to the first embodiment comprises a sampling section 101, a despread section 102, an integration section 103, a lead/lag addition circuit section (corresponding to lead/lag information addition means) 104, a delay circuit (corresponding to delay means) 108, a lead/lag level difference output section (corresponding to lead/lag level difference output means) 109, a pseudo noise code generation section 111, and a timing control section 112.

The sampling section 101 samples a received signal RxI[i-1:0], which is received by way of an unillustrated antenna and is in phase (I phase) with a received carrier wave, and a received quadrature signal ExQ[i-1:0], which differs in phase (Q phase) from the carrier wave by 90°, at the timing of an ELCLK signal output from the timing control section 412. Each of the received signals RxI and RxQ has a duration of i-bits. To clarify the bit configuration of a signal, the received signals are represented as RxI[i-1:0] and RxQ[i-1:0].

Signals ELI[i-1:0] and ELQ(i-1:0] resulting from sampling of the received signals RxI[i-1:0] and RxQ[i-1:0] by the sampling section 101 are despread by the despread section 102 through correlation of the PN system codes PnI and PnQ that are output from the pseudo noise code generation section 111 and serve as spread signals. The despread section 102 outputs to the integration section 103 correlation data I-phase PELI[j-1:0] and Q-phase PELQ[ j-1:0],each correlation data set comprising j-bits.

According to a lead/lag phase signal PNc which is output from the timing control section 112 and represents whether the spread signal is in a lead phase or a lag phase, a pseudo noise code generation section 111 supplies PN system codes PnI and PnQ, each of which is in a lead phase or a lag phase, to the despread section 102 by use of time division.

On the basis of a signal EL which is supplied from the timing control section 112 and indicates whether the lead-phase or lag-phase correlation data is computed, as well as on the basis of an Integ signal representing an integration number, the integration section 103 integrates the I-phase correlation data PELI[j-1:0l ] and the Q-phase correlation data PELQ[j-1:0l], each correlation data set comprising j-bits. Resultant I-phase integration data PELICc[k-1:0] (k>j), comprising k-bits, are output to the lead/lag addition circuit 104, and resultant Q-phase integration data PELQCc [k-1:0], comprising k-bits, are output to the lead/lag level difference output section 109 and the delay circuit 108 which delays integration data by only one symbol.

On the basis of the lead/lag phase signal EL received from the timing control section 112, the lead/lag addition circuit 104 adds lead/lag information (of one bit), which represents whether the signal output from the integration section is in a lead phase or a lag phase, to the I-phase integration data PELICc[k-1:0] which is output from the integration section 103 and comprises k-bits, thereby outputting I-phase lead/lag information added integration data PELIa[k:0] comprising k+1 bits. The lead/lag information (of one bit) is inserted into an arbitrary bit position in the I-phase integration data PELICc[k-1:0] comprising k-bits. For the sake of easy processing in a subsequent stage (i.e., the lead/lag level difference output section 109), more desirably the lead/lag information is placed in the position of the most significant bit or the position of the least significant bit.

The delay circuit 108 delays, by one symbol, the I-phase lead/lag information added integration data PELIa[k:0] comprising k+1 bits and the Q-phase integration data PELQCc[k-1:0] comprising k+1 bits, thereby outputting to the lead/lag level difference output section 109 the I-phase lead/lag information added delay integration data PELId [k:0] comprising k+1 bits and the Q-phase delayed integration data PELQd[k-1:0] comprising k-bits. More specifically, the delay circuit 108 is embodied by means of, e.g., a register provided in a digital signal processor (DSP).

The lead/lag level difference output section 109 calculates a level difference between lead phase and lag phase with regard to the I-phase received signal, from the I-phase lead/lag information added integration data PELIa[k:0] comprising k+1 bits and the I-phase lead/lag information added integration data PELId[k:0] comprising k+1 bits. Further, the lead/lag level difference output section 109 calculates a level difference between lead phase and lag phase with regard to the Q-phase received signal, from the Q-phase integration data PELQCc[k-1:0] comprising k-bits and the Q-phase delayed integration data PELQd[k-1:0] comprising k-bits. On the basis of the lead/lag information added to the I-phase lead/lag information added integration data PELIa[k:0] comprising k-bits or the I-phase lead/lag information added delayed integration data PELId[k:0] comprising k-bits, a determination is made as to whether or not the current symbol is lead or lag phase, thereby determining a subtraction number and a number to be subtracted. Thus, subtraction is then performed. The result of such subtraction is supplied to the timing control section 112 as a TAC (error signal) level difference between lead phase and lag phase. More specifically, the operations performed by the lead/lag level difference output section 109 are implemented by program processing operations carried out in, e.g., a digital signal processor (DSP).

The timing control section 112 controls sampling timing (i.e., the timing of the signal ELCLK), the lead/lag phase signal PNc, and the timing at which the lead/lag phase signal EL is switched between lead phase and lag phase so as to diminish the level difference TAC to zero, thus controlling the phase of the entire loop. More specifically, if the level of the received signal in lead phase is determined, from the level difference signal TAC, to be greater than the level of the received signal in lag phase, the phase of the loop is shifted so as to lag. In contrast, if the level of the received signal in lag phase is determined to be greater than the level of the received signal in lead phase, the phase of the loop is shifted so as to lead.

As mentioned previously, in the synchronization tracking section of the spread spectrum receiver according to the first embodiment, the sampling section 101 samples, at the sampling timing of the ELCK signal, the received signal RxI, which is in phase (I phase) with the carrier and the received quadrature signal RxQ, which differs in phase (Q phase) from the carrier wave by 90°. The despread section 102 despreads the received signals ELI and ELQ through correlation of a lead-phase spread signal PnI and a lag-phase spread signal PnQ. The integration section 103 integrates I-phase and Q-phase correlation data PELI and PELQ output from the despread section 102. The lead/lag addition section 104 adds, to the I-phase integration data PELICc received from the integration section 103, the lead/lag information representing whether the signal output from the integration section is in a lead phase or a lag phase. The delay circuit 108 delays, by one symbol, the Q-phase integration data PELQCC received from the integration section 103 and the I-phase lead/lag information added integration data PELIa received from the lead/lag addition section 104. The lead/lag level difference output section 109 outputs a TAC level difference between lead phase and lag phase on the basis of the Q-phase integration data PELQCc received from the integration section 103, the I-phase lead/lag information added integration data PELIa received from the lead/lag addition section 104, and the I-phase lead/lag information added delayed integration data PELId and the Q-phase delayed integration data PELQd, both of which are received from the delayed circuit 108. Further, the timing control section 112 controls the phase of the entire loop so as to eliminate the level difference, thus tracking the synchronization of the spread signals PnI and PnQ.

As mentioned above, the I-phase lead/lag information added integration data PELIa—to which the lead/lag information representing whether the signal output from the integration section is in a lead phase or a lag phase is added—and the lead/lag information added delayed integration data PELId are supplied to the lead/lag level difference output section 109 as integration data or delayed integration data. In contrast with the conventional spread spectrum receiver, the present invention prevents generation of an offset between the signal representing whether lead-phase or lag-phase correlation data are computed by the integration section and the signal representing whether the signal output from the integration section is in a lead phase or a lag phase, which would otherwise be generated for any of various reasons. Further, there is eliminated a necessity of the timing control section 112 to control the timing of the lead/lag level difference output section in consideration of a lag of a signal and a processing lag, which would otherwise be required by the conventional synchronization tracking section. Control of timing of the synchronization tracking loop is made simpler, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

(Second Embodiment)

Figure 2:
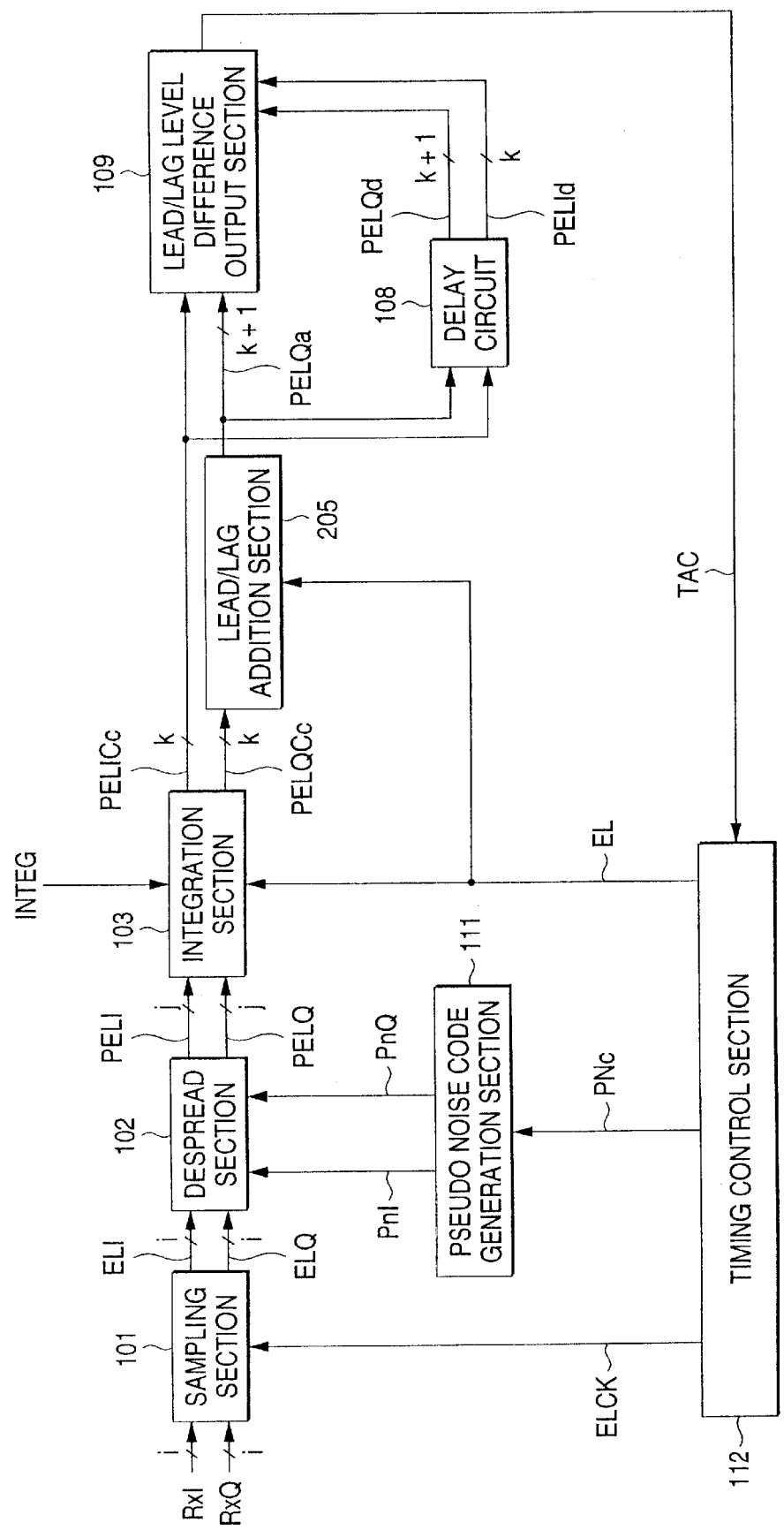
FIG. 2 is a circuit diagram showing the configuration of a synchronization tracking section in a spread spectrum receiver according to a second embodiment of the present invention.

FIG. 2 is a circuit diagram showing a synchronization tracking section in a spread spectrum receiver according to a second embodiment. In the drawing, those elements which are equivalent to those employed in the first embodiment (FIG. 1) are assigned the same reference numerals, and repetition of their detailed descriptions is omitted.

As shown in FIG. 2, the synchronization tracking section of the spread spectrum receiver according to the second embodiment comprises the sampling section 101, the despread section 102, the integration section 103, an addition circuit section (corresponding to lead/lag information addition means) 205, the delay circuit (corresponding to delay means) 108, the lead/lag level difference output section (corresponding to lead/lag level difference output means) 109, the pseudo noise code generation section 111, and the timing control section 112.

In the first embodiment, the lead/lag information representing whether the signal output from the integration section is in a lead phase or a lag phase is added to the I-phase integration data. In contrast, the second embodiment differs from the first embodiment in that in the second embodiment the lead/lag information is added to the Q-phase integration data. Consequently, the configuration and operations of the sampling section 101, the despread section 102,the pseudo noise code generation section 111, and the integration section 103 are identical with those in the first embodiment.

I-phase integration data PELICc[k-1:0] (k>j) comprising k-bits are output from the integration section 103 to the lead/lag level difference output section 109 and the delay circuit 108 which delays integration data by only one symbol. Further, the Q-phase integration data PELQCc[k-1:0] comprising k-bits are output to the lead/lag addition circuit 205.

On the basis of the lead/lag phase signal EL received from the timing control section 112, the lead/lag addition circuit 205 adds lead/lag information (of one bit), which represents whether the signal output from the integration section is in a lead phase or a lag phase, to the Q-phase integration data PELQCc[k-1:0] which is output from the integration section 103 and comprises k-bits, thereby outputting Q-phase lead/lag information added integration data PELQa[k:0] comprising k+1 bits. The lead/lag information (of one bit) is inserted into an arbitrary bit position in the Q-phase integration data PELQCc [k-1:0] comprising k-bits. For the sake of easy processing in a subsequent stage (i.e., the lead/lag level difference output section 109), more desirably the lead/lag information is placed in the position of the most significant bit or the position of the least significant bit.

The delay circuit 108 delays, by one symbol, the I-phase lead/lag information added integration data PELICc[k-1:0] comprising k bits and the Q-phase lead/lag information added integration data PELQa[k:0] comprising k+1 bits, thereby outputting to the lead/lag level difference output section 109 the I-phase delayed integration data PELId[k-1:0] comprising k bits and the Q-phase lead/lag information added delayed integration data PELQd[k:0] comprising k+1 bits. More specifically, the delay circuit 108 is embodied by means of, e.g., a register provided in a digital signal processor (DSP).

The lead/lag level difference output section 109 calculates a level difference between lead phase and lag phase with regard to the I-phase received signal, from the I-phase integration data PELICc[k-1:0] comprising k bits and the I-phase delayed integration data PELId[k-1:0] comprising k bits. Further, the lead/lag level difference output section 109 calculates a level difference between lead phase and lag phase with regard to the Q-phase received signal, from the Q-phase lead/lag information added integration data PELQa[k:0] comprising k+1 bits and the Q-phase lead/lag information added delayed integration data PELQd[k:0] comprising k+1 bits. On the basis of the lead/lag information added to the Q-phase lead/lag information added integration data PELQa[k:0] or the Q-phase lead/lag information added delayed integration data PELQd[k:0], a determination is made as to whether or not the current symbol is lead or lag phase, thereby determining a subtraction number and a number to be subtracted. Thus, subtraction is then performed. The result of such subtraction is supplied to the timing control section 112 as a TAC (error signal) level difference between lead phase and lag phase. More specifically, the operations performed by the lead/lag level difference output section 109 are implemented by program processing operations carried out in, e.g., a digital signal processor (DSP).

The timing control section 112 controls sampling timing (i.e., the timing of the signal ELCLK), the lead/lag phase signal PNc, and the timing at which the lead/lag phase signal EL is switched between lead phase and lag phase so as to diminish the level different TAC to zero, thus controlling the phase of the entire loop. More specifically, if the level of the received signal in lead phase is determined, from the level difference signal TAC, to be greater than the level of the received signal in lag phase, the phase of the loop is shifted so as to lag. In contrast, if the level of the received signal in lag phase is determined to be greater than the level of the received signal in lead phase, the phase of the loop is shifted to as to lead.

As mentioned previously, in the synchronization tracking section of the spread spectrum receiver according to the second embodiment, the sampling section 101 samples, at the sampling timing of the ELCK signal, the received signal RxI, which is in phase (I phase) with the carrier and the received quadrature signal RxQ, which differs in phase (Q phase) from the carrier wave by 90°. The despread section 102 despreads the received signals ELI and ELQ through correlation of a lead-phase spread signal PnI and a lag-phase spread signal PnQ. The integration section 103 integrates I-phase and Q-phase correlation data PELI and PELQ output from the despread section 102. The lead/lag information addition section 205 adds, to the Q-phase integration data PELIQC received from the integration section 103, the lead/lag information representing whether the signal output from the integration section is in a lead phase or a lag phase. The delay circuit 108 delays, by one symbol, the I-phase integration data PELICc received from the integration section 103 and the Q-phase lead/lag information added integration data PELQa received from the lead/lag information addition section 205. The lead/lag level difference output section 109 outputs a TAC level difference between lead phase and lag phase on the basis of the I-phase integration data PELICc received from the integration section 103, the Q-phase lead/lag information added integration data PELQa received from the lead/lag information addition section 205, and the I-phase delayed integration data PELId and the Q-phase lead/lag information added delayed integration data PELQd, both of which are received from the delayed circuit 108. Further, the timing control section 112 controls the phase of the entire loop so as to eliminate the level difference, thus tracking the synchronization of the spread signals PnI and PnQ.

As mentioned above, the Q-phase lead/lag information added integration data PELQa—to which the lead/lag information representing whether the signal output from the integration section is in a lead phase or a lag phase is added—and the lead/lag information added delayed integration data PELQd are supplied to the lead/lag level difference output section 109 as integration data and delayed integration data. In contrast with the conventional spread spectrum receiver, the spread spectrum receiver according to the present invention prevents generation of an offset between the signal representing whether lead-phase or lag-phase correlation data are computed by the integration section and the signal representing whether the signal output from the integration section is in a lead phase or a lag phase, which would otherwise be generated for any of various reasons. Further, there is eliminated a necessity for the timing control section 112 to control the timing of the lead/lag level difference output section in consideration of a lag of a signal and a processing lag, which would otherwise be required by the conventional synchronization tracking section. Control of timing of the synchronization tracking loop is made simpler, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

[Third Embodiment]

Figure 3:
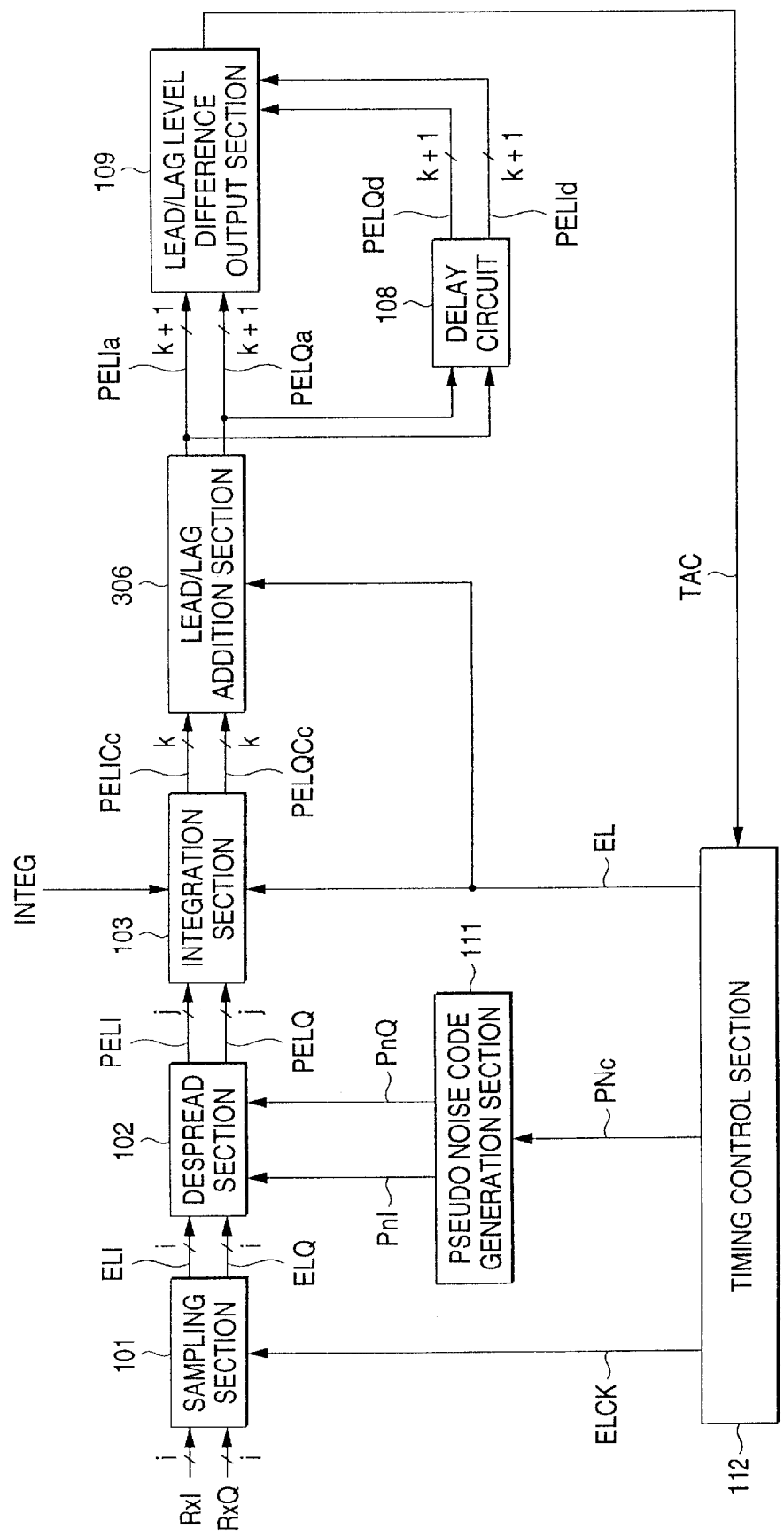
FIG. 3 is a circuit diagram showing the configuration of a synchronization tracking section in a spread spectrum receiver according to a third embodiment of the present invention.

FIG. 3 is a circuit diagram showing a synchronization tracking section in a spread spectrum receiver according to a third embodiment. In the drawing, the elements that are equivalent to those employed in the first and second embodiments (FIGS. 1 and 2) are assigned the same reference numerals, and repetition of their detailed descriptions is omitted.

In FIG. 3, the synchronization tracking section of the spread spectrum receiver according to the third embodiment comprises the sampling section 101, the despread section 102, the integration section 103, an addition circuit section (corresponding to lead/lag information addition means) 306, the delay circuit (corresponding to delay means) 108, the lead/lag level difference output section (corresponding to lead/lag level difference output means) 109, the pseudo noise code generation section 111, and the timing control section 112.

In the first embodiment, the lead/lag information representing whether the signal output from the integration section is in a lead phase or a lag phase is added to the I-phase integration data. Further, in the second embodiment, the lead/lag information is added to the quadrature (Q-phase) integration data. In contrast, the third embodiment differs from the first and second embodiments in that in the third embodiment the lead/lag information is added to both the I-phase and Q-phase integration data sets. Consequently, the configuration and operations of the sampling section 101, the despread section 102, the pseudo noise code generation section 111, and the integration section 103 are identical with those in the first and second embodiments.

Both I-phase integration data PELICc[k-1:0] comprising k-bits and Q-phase integration data PELQCc[k-1:0] comprising k-bits are output from the integration section 103 to the lead/lag level difference output section 109.

On the basis of the lead/lag phase signal EL received from the timing control section 112, the lead/lag addition circuit 306 adds lead/lag information (of one bit), which represents whether the signal output from the integration section is in a lead phase or a lag phase, to the I-phase integration data PELICc[k-1:0] and the Q-phase integration data PELQCc[k-1:0], both of which are output from the integration section 103 and comprise k-bits, thereby outputting I-phase lead/lag information added integration data PELIa[k:0] and Q-phase lead/lag information added integration data PELQa[k:0], both of which comprise k+1 bits. The lead/lag information (of one bit) is inserted into an arbitrary bit position in the I-phase integration data PELICc[k-1:0] comprising k-bits and an arbitrary bit position in the Q-phase integration data PELIQCc[k-1:0] comprising k-bits. For the sake of easy processing in a subsequent stage (i.e., the lead/lag level difference output section 109), more desirably the lead/lag information is placed in the position of the most significant bit or the position of the least significant bit.

The delay circuit 108 delays, by one symbol, the I-phase lead/lag information added integration data PELIa[k:0] comprising k+1 bits and the Q-phase lead/lag information added integration data PELQa[k:0] comprising k+1 bits, thereby outputting to the lead/lag level difference output section 109 the I-phase lead/lag information added delayed integration data PELId[k:0] comprising k+1 bits and the Q-phase lead/lag information added delayed integration data PELQd[k:0] comprising k+1 bits. More specifically, the delay circuit 108 is embodied by means of, e.g., a register provided in a digital signal processor (DSP).

The lead/lag level difference output section 109 calculates a level difference between lead phase and lag phase with regard to the I-phase received signal, from the I-phase lead/lag information added integration data PELIa[k:0] comprising k+1 bits and the I-phase lead/lag information added delayed integration data PELId[k:0] comprising k+1 bits. Further, the lead/lag level difference output section 109 calculates a level difference between lead phase and lag phase with regard to the Q-phase received signal, from the Q-phase lead/lag information added integration data PELQa[k:0] comprising k+1 bits and the Q-phase lead/lag information added delayed integration data PELQd[k:0] comprising k+1 bits. On the basis of the lead/lag information added to the I-phase and Qphase lead/lag information added integration data or the I-phase and Q-phase lead/lag information added delayed integration data, a determination is made as to whether or not the current symbol is in a lead phase or a lag phase, thereby determining a subtraction number and a number to be subtracted. Thus, subtraction is then performed. The result of such subtraction is supplied to the timing control section 112 as a TAC (error signal) level difference between lead phase and lag phase. More specifically, the operations performed by the lead/lag level difference output section 109 are implemented by program processing operations carried out in, e.g., a digital signal processor (DSP).

The timing control section 112 controls sampling timing (i.e., the timing of the signal ELCLK), the lead/lag phase signal PNc, and the timing at which the lead/lag phase signal EL is switched between lead phase and lag phase so as to diminish the level different TAC to zero, thus controlling the phase of the entire loop. More specifically, if the level of the received signal in lead phase is determined, from the level difference signal TAC, to be greater than the level of the received signal in lag phase, the phase of the loop is shifted so as to lag. In contrast, if the level of the received signal in lag phase is determined to be greater than the level of the received signal in lead phase, the phase of the loop is shifted so as to lead.

As mentioned previously, in the synchronization tracking section of the spread spectrum receiver according to the third embodiment, the sampling section 101 samples, at the sampling timing of the ELCK signal, the received signal RxI, which is in phase (I phase) with the carrier and the received quadrature signal RxQ, which differs in phase (Q phase) from the carrier wave by 90°. The despread section 102 despreads the received signals ELI and ELQ through correlation of a lead-phase spread signal PnI and a lag-phase spread signal PnQ. The integration section 103 integrates I-phase and Q-phase correlation data PELI and PELQ output from the despread section 102. The lead/lag information addition section 306 adds, to the I-phase integration data PELICc and the Q-phase integration data PELIQc, both of which are received from the integration section 103, the lead/lag information representing whether the signal output from the integration section is in a lead phase or a lag phase. The delay circuit 108 delays, by one symbol, the I-phase lead/lag information added integration data PELIa and the Q-phase lead/lag information added integration data PELQa, both of which are received from the lead/lag information addition section 306. The lead/lag level difference output section 109 outputs a TAC level difference between lead phase and lag phase on the basis of the I-phase lead/lag information added integration data PELIa and the Q-phase lead/lag information added integration data PELQa, both of which are received from the lead/lag information addition section 306, and the I-phase lead/lag information added delayed integration data PELId and the Q-phase lead/lag information added delayed integration data PELQd, both of which are received from the lead/lag information addition section 306. Further, the timing control section 112 controls the phase of the entire loop so as to eliminate the level difference, thus tracking the synchronization of the spread signals PnI and PnQ.

As mentioned above, the I-phase lead/lag information added integration data PELIa, the Q-phase lead/lag information added integration data PELQa, the I-phase lead/lag information added delayed integration data PELId, and the Q-phase lead/lag information added delayed integration data PELQd,—to all of which is added the lead/lag information representing whether the signal output from the integration section is in a lead phase or a lag phase-are supplied to the lead/lag level difference output section 109 as integration data and delayed integration data. In contrast with the conventional spread spectrum receiver, the spread spectrum receiver according to the present invention prevents generation of an offset between the signal representing whether lead-phase or lag-phase correlation data are computed by the integration section and the signal representing whether the signal output from the integration section is in a lead phase or a lag phase, which would otherwise be caused for any of various reasons. Further, there is eliminated a necessity of the timing control section 112 controlling the timing of the lead/lag level difference output section in consideration of a lag of a signal and a processing lag, which would otherwise be required by the conventional synchronization tracking section. Control of timing of the synchronization tracking loop is made simpler, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

As has been described above, in a spread spectrum receiver according to the present invention, despread means despreads received signals through correlation of a lead-phase spread signal and a lag-phase spread signal. Integration means integrates the signal output from the despread means. Lead/lag information addition means adds, to the signal received from the integration means, lead/lag information representing whether the signal output from the integration means is in a lead phase or a lag phase. Delay means delays, by one symbol, the signal received from the lead/lag information addition means. The lead/lag level difference output means outputs a level difference between lead phase and lag phase on the basis of the signal output from the lead/lag information addition means and the signal output from the delay means. Further, timing control means controls the phase of the entire loop so as to eliminate the level difference, thus tracking synchronization of the spread signals. Information as to whether the spread signals are in a lead phase or a lag phase is added to the integration data and the delayed integration data supplied to the lead/lag level difference output means. Timing control performed by the loop for synchronization tracking is made simple, thus enabling reliable and highly accurate tracking and holding of synchronization of the spread signal without involving erroneous operations. Further, the present invention diminishes the necessity for strict management of individual processing timings in the synchronization tracking loop, thus affording a high degree of flexibility in terms of system design.

What is claimed is:

1. A spread spectrum receiver having a synchronization tracking section for tracking synchronization between a phase-lead spread signal and a phase-lag spread signal through correlation of the spread signals by use of time division so as to generate an error signal between the two spread signals, the spread spectrum receiver comprising:

despread means for despreading a received signal through correlation;

integration means for integrating a signal output from the despread means;

lead/lag information addition means for adding, to a signal output from the integration means, lead/lag information representing whether the signal output from the integration means is in a lead phase or a lag phase;

delay means for delaying, by one symbol, a signal output from the lead/lag information addition means;

lead/lag level difference output means for outputting a level difference between lead phase and lag phase on the basis of the signal output from the lead/lag information addition means and the signal output from the delay means; and timing control means for controlling the phase of the spread spectrum receiver so as to eliminate the level difference.

2. A spread spectrum receiver as claimed in claim 1, wherein said despread means despreads, through correlation, the received signal which is in phase with a carrier wave and a received quadrature signal which differs in phase from the carrier wave by 90°;

said integration means integrates the in-phase and quadrature signals output from the despread means, respectively;

said lead/lag information addition means adds, to the in-phase signal output from the integration means, lead/lag information representing whether the in-phase signal output from the integration means is in a lead phase or a lag phase;

said delay means delays, by one symbol, the quadrature signal output from the integration means and the in-phase signal output from the lead/lag information addition means; and said lead/lag level difference output means outputs a level difference between lead phase and lag phase on the basis of the quadrature signal output from the integration means, the in-phase signal output from the lead/lag information addition means, and the signal outputs from the delay means.

3. A spread spectrum receiver as claimed in claim 1, wherein said despread means despreads, through correlation, the received signal which is in phase with a carrier wave and a received quadrature signal which differs in phase from the carrier wave by 9°;

said integration means integrates the in-phase and quadrature signals output from the despread means, respectively;

said lead/lag information addition means adds, to the quadrature signal output from the integration means, lead/lag information representing whether the quadrature signal output from the integration means is in a lead phase or a lag phase;

said delay means for delaying, by one symbol, the in-phase signal output from the integration means and the quadrature signal output from the lead/lag information addition means;

said lead/lag level difference output means outputs a level difference between lead phase and lag phase on the basis of the in-phase signal output from the integration means, the quadrature signal output from the lead/lag information addition means, and the signal output from the delay means.

4. A spread spectrum receiver as claimed in claim 1, wherein said despread means despreads, through correlation, the received signal which is in phase with a carrier wave and a received quadrature signal which differs in phase from the carrier wave by 90°;

said integration means integrates the in-phase and quadrature signals output from the despread means, respectively;

said lead/lag information addition means adds, to the in-phase and quadrature signals output from the integration means, lead/lag information representing whether the in-phase and quadrature signal outputs from the integration means are in a lead phase or a lag phase;

said delay means delays, by one symbol, the signal outputs from the lead/lag information addition means;

said lead/lag level difference output means outputs a level difference between lead phase and lag phase on the basis of the signal outputs from the lead/lag information addition means and the signal outputs from the delay means.

5. A spread spectrum receiver as claimed in any one of claims 1 to 4, further comprising sampling means for sampling the received signal at predetermined sampling timing, and wherein the despread means despreads the thus-sampled received signal; and the timing control means controls the sampling timing according to the level difference.

6. A spread spectrum receiver as claimed in any one of claims 1 to 4, wherein a spread signal corresponds to a pseudo noise code; the spread spectrum receiver comprises pseudo noise code generation means for supplying to the despread means, by use of time division, two pseudo noise codes; namely, a phase-lead pseudo noise code and a phase-lag pseudo noise code, according to a lead/lag signal representing whether the spread signal is in a lead phase or a lag phase; and the timing control means controls the timing at which the lead/lag signal is switched according to the level difference.

7. A synchronization tracking circuit for use in a spread spectrum receiver, which tracks synchronization between a phase-lead spread signal and a phase-lag spread signal through correlation of the spread signals by use of time division so as to generate an error signal between the two spread signals, the synchronization tracking circuit comprising:

despread means for despreading received signals through correlation;

integration means for integrating a signal output from the despread means;

lead/lag information addition means for adding, to a signal output from the integration means, lead/lag information representing whether the signal output from the integration means is in a lead phase or a lag phase;

delay means for delaying, by one symbol, a signal output from the lead/lag information addition means;

lead/lag level difference output means for outputting a level difference between lead phase and lag phase on the basis of the signal output from the lead/lag information addition means and the signal output from the delay means; and timing control means for controlling the phase of the synchronization tracking circuit so as to eliminate the level difference.

* * * * *

UNITED STATES PATENT AND TRADEMARK OFFICE
CERTIFICATE OF CORRECTION

PATENT NO. : 6,438,157 B1  Page 1 of 1
DATED : August 20, 2002
INVENTOR(S) : Yoshiki Mamori It is certified that error appears in the above-identified patent and that said Letters Patent is hereby corrected as shown below:

Column 2,
Line 23, please delete "byway", and insert therefor -- by way --.

Column 3,
Line 51, please delete "10".

Column 6,
Line 61, please delete "the-integration", and insert therefor -- the integration --.

Column 9,
Line 9, please delete "PELQ[j-1:01", and insert therefor -- PELQ[j-1:0] --.

Column 10,
Line 29, please delete "PELQCC", and insert therefor -- PELQCc --.

Column 12,
Line 48, please delete "PELIQC", and insert therefor -- PELIQc --.

Column 14,
Line 40, please delete "Qphase", and insert therefor -- Q-phase --.
Line 43, please delete "ina", and insert therefor -- in a --.

Column 17,
Line 11, please delete "9º", and insert therefor -- 90º --.

Signed and Sealed this

Twenty-eighth Day of January, 2003

JAMES E. ROGAN
*Director of the United States Patent and Trademark Office*